Oct. 11, 1927.
H. H. ZEAL
1,645,211
THERMOMETER
Filed April 9, 1926
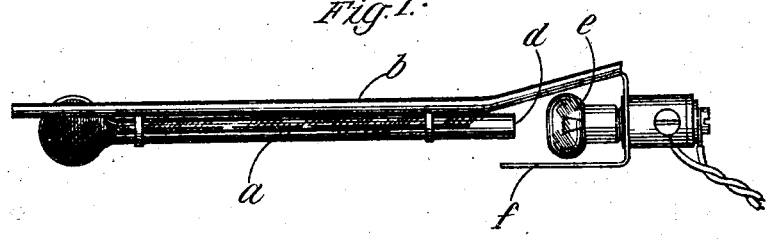
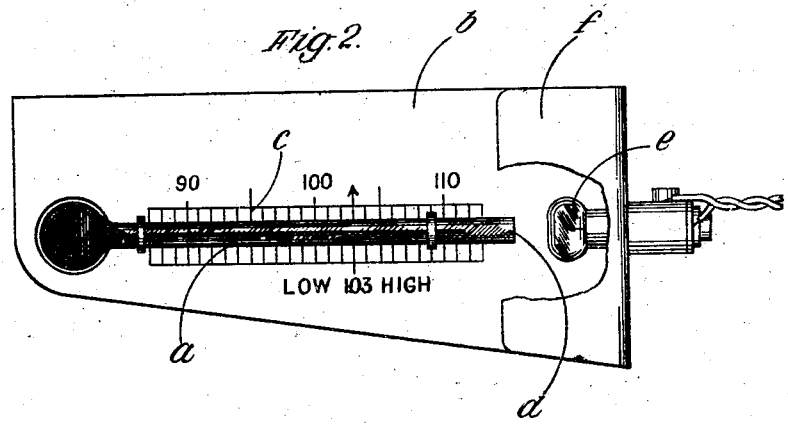
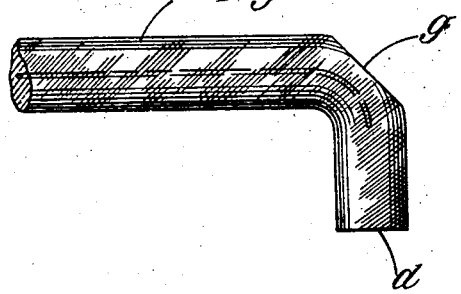
INVENTOR,
HERBERT HENRY ZEAL
BY
ATTORNEYS.

Patented Oct. 11, 1927.

1,645,211

UNITED STATES PATENT OFFICE.

HERBERT HENRY ZEAL, OF CLERKENWELL, LONDON, ENGLAND.

THERMOMETER.

Application filed April 9, 1926, Serial No. 100,813, and in Great Britain January 15, 1926.

This invention relates to illuminable thermometers, (such, for instance, as those used in incubators, which are generally situated in a dark position) which may be required to be illuminated only for a few moments and has for its object cheap means to render more readily visible than heretofore the thermometric column and in some cases a thermometric scale formed separately from the tube of the thermometer.

Illuminable thermometers have been proposed in which the thermometer tube is disposed in front of a translucent background of opal glass or the like bearing the thermometric scale, an electric light bulb being disposed behind said translucent background but, although the thermometric column and scale are thus illuminated to some extent, the production of such thermometers is expensive. It has also been proposed to dispose the thermometer tube in front of a slot or aperture in an opaque scale bearing background behind which an electric light bulb and a reflector are disposed, but it has been found that the scale is not illuminated sufficiently and the background has been perforated to indicate the graduations of the thermometric scale.

According to the present invention the light is transmitted substantially axially along the thermometer tube. For this purpose the sealed end of the thermometer tube is preferably formed normal to the axis of said tube near said end and the source of light is preferably arranged on said axis. The thermometer tube may be straight throughout its length in which case said tube and an electric light bulb or the like may be arranged in front of an opaque scale-bearing background, or said tube may be of L or other shape, suitable reflecting surfaces being provided at the bends, in which case the tube may be disposed partly in front of and partly behind the background, the source of light being situated behind said background and preferably on the axis of the tube near its sealed end.

The invention is illustrated by the accompanying drawings as applied to an incubator thermometer, but it is to be understood that it is applicable also to illuminable thermometers for other purposes.

In the drawings Figure 1 is a plan, and Figure 2 a front elevation (part being broken away) of one form of incubator thermometer made in accordance with this invention and Figure 3 is a fragmentary view of a modified form of thermometer tube.

As shown in Figures 1 and 2, a thermometer tube $a$ is disposed in front of an opaque background $b$ bearing a graduated scale $c$ the latter and the mounting of said tube being as usual in such articles. The sealed end of the tube $a$, however, is formed normal to its axis, as shown at $d$ and the background $b$ is retroverted so as to enable an electric light bulb $e$ to be mounted coaxially with the tube $a$ so as to direct a beam of light therealong, the retroversion of the background $b$ also providing a shield $f$ for cutting off the bulb $e$ from direct vision by the observer.

When the circuit of the lamp bulb $e$ is closed the light passes directly along the thermometer tube $a$ without undergoing that refraction which would take place if the sealed end of said tube were rounded as usual, consequently the thermometric column is illuminated, whilst those rays of light which pass alongside the tube $a$ serve to illuminate the scale $c$. In this manner the thermometric column is rendered very readily visible, especially if, as usual, the tube $a$ be provided with the usual white background.

If desired the graduated scale may be engraved on the tube $a$ itself instead of on the background $b$ especially if a bent tube $a$ as indicated in Figure 3 be employed and the bulb $e$ be disposed behind said background. In such a case a total reflection surface $g$ should be formed at each bend.

It is not essential that the end surface $d$ be normal to the axis of the adjacent portion of the tube $a$ as, by suitable disposition of the bulb $e$ according to the obliquity of said end and the refractive index of the glass a similar result could be attained.

I claim:—

1. An illuminable thermometer including a source of light and a thermometer tube wherein the end of the thermometer tube is a plane surface substantially normal to the axis of the adjacent portion of the tube, and wherein the source of light is situated substantially co-axially with said adjacent portion whereby the light is transmitted substantially along the axis of the thermometer tube.

2. An illuminated thermometer comprising a thermometer tube terminating in a plane surface substantially normal to the axis of the adjacent portion of the tube, a source of light located in line with said axis and adapted to transmit light along said axis, said thermometer tube comprising bends, and being formed with total reflecting surfaces at said bends.

HERBERT HENRY ZEAL.